US011520641B1

(12) United States Patent
Karunagaran et al.

(10) Patent No.: US 11,520,641 B1
(45) Date of Patent: Dec. 6, 2022

(54) MODEL TO RECOMMEND IMPACTED SYSTEMS

(71) Applicant: Bank of America Corporation, Charlotte, NC (US)

(72) Inventors: Sivasankar Karunagaran, Chennai (IN); Vidya Raghunathan, Chennai (IN); Surendra Korrapati, Telangana (IN); Gaurav Bansal, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/500,043

(22) Filed: Oct. 13, 2021

(51) Int. Cl.
G06F 3/00 (2006.01)
G06F 9/54 (2006.01)
G06Q 20/10 (2012.01)

(52) U.S. Cl.
CPC .......... *G06F 9/541* (2013.01); *G06Q 20/108* (2013.01)

(58) Field of Classification Search
CPC ....................................................... G06F 9/54
See application file for complete search history.

(56) References Cited

U.S. PATENT DOCUMENTS

2010/0235823 A1* 9/2010 Garbers ................. G06F 8/71
717/170

FOREIGN PATENT DOCUMENTS

BR PI0400371 A * 1/2005
WO WO-0023898 A1 * 4/2000 ............ H04M 15/00

OTHER PUBLICATIONS

Gabriele Bavota, The Impact of API Change—and Fault-Proneness on the User Ratings of Android Apps (Year: 2015).*

* cited by examiner

Primary Examiner — Lechi Truong
(74) Attorney, Agent, or Firm — Weiss & Arons LLP (57) ABSTRACT

Systems and methods for determining the impact of a modification made to an API is provided. The system may include an association rule learning subsystem and a recommender subsystem. The association rule learning subsystem may receive input from an API, a metadata processor and a plurality of production logs. The API may include a plurality of API elements. The association rule learning subsystem may link each API element with one or more data elements retrieved by the metadata processors based on data retrieved from the plurality of production logs. The association rule learning subsystem may create and output a tree of API elements and linked data elements. A recommender subsystem may receive the tree. The recommender subsystem may prioritize the data elements included in the tree based on data element severity, data element frequency and data element complexity. The recommender subsystem may select a prioritized subset of the data elements.

20 Claims, 3 Drawing Sheets

MODEL TO RECOMMEND IMPACTED SYSTEMS

FIELD OF TECHNOLOGY

Aspects of the disclosure relate to enterprise-level software.

BACKGROUND OF THE DISCLOSURE

Enterprise-level software typically includes three layers: a user interface (UI) layer, an application programming interface (API) layer and a database layer.

The UI layer may include one or more interfaces that interact with a user. The UI layer may also be known as the front-end of an application.

The API layer may include one or more APIs that interface between the UI layer and the database layer. The API layer may also be referred to as the middleware layer. The API layer may execute the logic for the application. In certain less complex software applications, a single API may interface between the UI layer and the database layer. However, in more complex software applications, multiple layers of APIs may be included in the API layer. As such, a first API may call a second API, which may call a third API, which may call a fourth and/or a fifth API. Each of the first, second, third, fourth and fifth API may or may not communicate with the database layer. The communications between the API layer and the database layer may retrieve data from the database layer. It should be appreciated that a single API may be referenced by more than one UI.

The database layer may include one or more databases. The databases may be Hadoop™ databases, Oracle™ databases and/or any other suitable databases. The one or more databases may include data elements. The data elements may be referenced by, and retrieved from, the APIs included in the API layer.

Therefore, it would be desirable for an appliance that identifies each application and/or API that may be affected by a modification to a first API.

Additionally, currently, there is no available appliance for determining secondary relationships between APIs and applications. Therefore, there is no method for sustainability validation of each application and/or API that may be impacted by the modification. As such, it would be further desirable for the appliance to identify all applications and APIs that are associated with the first API via a first-degree and/or second-degree relationships.

Furthermore, it would be desirable for the appliance to notify the owners of the affected applications and/or APIs. Such an appliance may enable the owners of the affected applications and/or APIs to modify the applications and/or APIs so that the applications and/or APIs remain operational after the modification of the first API.

SUMMARY OF THE DISCLOSURE

Because APIs, included in the API layer, may be interconnected and a single API may be referenced by multiple UIs, a modification made to an existing API may impact various other APIs, UI applications and/or other applications. Both UI applications and/or other applications may be referred to collectively, in the alternative, as applications. Therefore, a modification made to a first API may generate ripple effects throughout multiple APIs and multiple applications.

It may be difficult to readily identify the APIs and applications affected by a modification. As such, a modification made to a first API may cause failures to applications or APIs that are connected to the first API. It should be appreciated that the affected applications or APIs may be connected to the first API via a direct connection or an indirect connection.

As stated above, the ripple effects of a modification made to an API may be difficult to identify. Therefore, in order to avoid causing failures to APIs, one workaround that may be utilized is API versioning. API versioning may involve cloning the existing API and creating an additional version of the API. The additional version may be used for a new application that requires a modified API. The additional version may be customized to the new application. However, this workaround may involve at least one drawback: multiple versions of multiple APIs may be difficult to manage and resource-costly to maintain.

Apparatus and methods are provided for modeling impacts made by a change to an API.

The system may characterize a relationship between the API undergoing a change and one or more APIs and applications with which the API is related.

In order to establish a relationship between the API undergoing the change and the one or more related APIs and applications, an association rule learning engine, using machine learning, may retrieve a feed from a production log. The production log may include details relating to executed computing instructions within the overall computing ecosystem. The association rule learning engine may match the production log with each of the API elements included in the API undergoing a modification. The matching between the production log and each of the API elements may identify applications and APIs that are associated with the API elements. The association rule learning engine may store the identified API elements as a production log set of identified applications and APIs.

The association rule learning engine may also match each of the API elements, included in the API undergoing a modification, to a channel layer, business layer and data layer associated with the API. The matching between the API elements and the channel layer, business layer and data layer may identify additional applications and APIs that are associated with the API elements. The additional applications and APIs may be referred to as a channel layer, business layer and data layer set of identified applications and APIs.

The association rule learning engine may store the channel layer, business layer and data layer set of identified applications and APIs. The channel layer, business layer and data layer set of identified applications and APIs may be organized by a metadata processor. The metadata processor may be, or be resident on, a hardware processor. The channel layer, business layer and data layer set of identified applications and APIs may be stored together with, or separately from, the production log set of identified applications and APIs. In some embodiments, the channel layer, business layer and data layer set of identified applications and APIs may be added to the production log set of identified applications and APIs. In yet other embodiments, the channel layer, business layer and data layer set of identified applications and APIs may be compared to the production log set of applications and APIs.

At a high level, the association rule learning engine may identify the impact, of the modification to the API elements, to other APIs and data sources based on the following weighed links:

$E = \{e_1, e_2, e_3 \ldots e_n\}$ set of n elements in an API
$A = \{a_1, a_2, a_3 \ldots a_n\}$ set of APIs consumed by these APIs
$C = \{c_1, c_2, c_3 \ldots c_n\}$ number of applications (channels) used this element
$D = \{d_1, d_2, d_3 \ldots d_n\}$ number of database systems through which these element records flow The exemplary algorithm of the association rule learning engine is as follows: For every change in element E, identify and associate all the APIs (As), channels (Cs) and database systems (Ds) that are impacted and that need to be changed.

In an example, an account services API may include a first name field, a middle name field and a last name field. A modification may be suggested to remove the middle name field from the account services API. In order to identify the impact of such a modification, the association rule learning engine may identify all applications included in the channel layer, the business layer and the data layer associated with the account services API.

In this example, the channel layer may involve a call center channel, an online channel and a mobile channel. As such, the call center channel may utilize the middle name field, the online channel may utilize the middle name field and the mobile channel may also utilize the middle name field. The association rule learning engine may also identify one or more databases that may utilize the middle name field.

It should be appreciated, that the association rule learning engine may be able to identify applications and APIs that may be associated with each element included in the API undergoing the modification. In the example above, the association rule learning engine may identify the channels that may involve the middle name field.

In some embodiments, the association rule learning may only identify applications and APIs that are associated with a predetermined element included in the API undergoing the modification. As such, the association rule learning may identify applications and APIs that are associated with the predetermined element to the exclusion of the other elements included in the API.

The output of the association rule learning engine may be a plurality of applications and layers, such as channels, APIs, and data sources, that may involve a relationship with the API undergoing the change.

It should be appreciated that the output of the association rule learning engine may be a large amount of data. It may be difficult to manage each possible impacted application and API. Therefore, in order to prioritize the list of impacted systems, the output of the association rule learning engine may be inputted into a recommender system. A recommender system may be a system that prioritizes the output of the association rule learning engine.

In addition to the output of the association rule learning engine, the recommender system may receive additional inputs. The additional inputs may enable the recommender system to prioritize, based on the additional inputs, the output of the association rule learning engine.

The additional inputs may include the production logs. The production logs may be the same production logs that are inputted into the association rule learning engine. However, since the function of the recommender system is to prioritize the output of the association rule learning engine, the production logs, as inputted into the recommender system, may be used to provide historical data to the recommender system. The historical data, included in the production logs, may enable the recommender system to identify the frequency of a relationship.

Another input into the recommender system may include criteria data. The criteria data may include severity of the application that utilizes the API, usage of the API and existing impact complexity. Severity of the API may include data relating to whether the API is critical in the functioning of an application, and therefore, whether the API can endure downtime. Critical APIs may include, for example, client-facing APIs. APIs that cannot endure significant, or any, downtime may be marked with higher severity scores, while APIs that can endure some downtime may be marked with lower severity scores.

Severity of the application may also relate to whether the application is an enterprise critical application. Enterprise critical applications may be marked with higher severity scores while non-critical applications may be marked with lower severity scores.

Usage of the API may relate to the frequency of the API usage. More frequently used APIs may be marked with higher frequency scores while less frequently used APIs may be marked with lower frequency scores.

Existing impact complexity may also be a factor in inputted criteria. The existing impact complexity may involve the number of applications that are associated with the application. As such, applications that are involved with higher than a predetermined number of applications may be marked as high complexity, while applications that are involved with lower than the predetermined number of applications may be marked as low complexity.

These three inputs (and/or any other suitable inputs)—i.e., the output of the association rule learning engine, the production logs and the criteria may be input into the recommender system. The recommender system may prioritize the output of the association rule learning engine and identify the top n number of applications for impact management. The top n number of applications may be identified as the critical impact list. The recommender system may utilize an algorithm such as a popularity-based recommendation to provide the critical impact list. The recommender system may initially utilize the criteria to prioritize. The recommender system may defer to the production logs when the certainty is unclear based on the criteria.

The critical impact list, as well as other data, such as the criteria, the production logs and the output of the association rule learning engine may be passed from the recommender system to an API governance model (or other suitable location). The API governance model may store the data for input into the association rule learning engine in the event that the API undergoing a modification is modified pursuant to another event.

Additionally, the recommender system may divide the list of impacted system into two subsets. A first subset may be an automated subset, while a second subset may be a non-automated subset. The automated subset may include the notification to the stakeholders in an automated system, while the non-automated subset may require additional functions to be executed prior to the transmission of the notification. The notifications may include details relating to the modification to the API, and details relating to the possible affects to the application for which the stakeholder is accountable.

Methods for identifying an impact of a modification made to an API is provided. Methods may include receiving the API identified for modification. The API may include a plurality of API elements. Methods may determine whether the API is indexed. Indexed APIs may be transmitted directly to an association rule learning subsystem. Non-indexed APIs may be transmitted to an element preprocessor. The indexing may include identifying a plurality of APIs and/or applications that are interconnected with the API.

Methods may include accessing, by the element preprocessor, an API metadata catalogue. Methods may include accessing, by the API metadata catalogue, a plurality of layers. Methods may include identifying, by a metadata processor, from the plurality of layers, a plurality of APIs, applications and data elements that are interconnected with the API. The interconnected API data may be transferred from the metadata processor to the association rule learning subsystem. A plurality of production logs may be transferred to the association rule learning subsystem. The production logs may include historical data relating to the API.

Methods may include association, at the association rule learning subsystem, each API element, included in the API, with each data element, middleware, channel, API and application that is directly and indirectly connected to the API. Methods may include generating, at the association rule learning subsystem, a list of data elements, middleware, channels, APIs and applications that are directly and indirectly connected to the API.

Methods may include transferring the list of data elements from the association rule learning subsystem to a recommender subsystem. Methods may include inputting the plurality of production logs to the recommender subsystem.

Methods may include inputting a listing of criteria to the recommender subsystem. The listing of criteria may include an application severity metric. The application severity metric may identify the importance of the data element, middleware, channel, API or application to an underlying organization. The listing of criteria may include a usage frequency metric. The usage frequency metric may identify the usage frequency of the data element, middleware, channel, API or application within the underlying organization. The listing of criteria may include a complexity metric. The complexity metric may identify the number of interconnections associated with the data element, middleware, channel, API or application. Based on the listing of criteria and the production logs, methods may include prioritizing the list received from the association rule learning subsystem.

The recommender subsystem may prioritize based on the listing of criteria and utilize the priority of production logs for determination when the listing of criteria is over a threshold of ambiguity.

Methods may include dividing the list into two lists: an auto notification list and a non-auto notification list. Methods may include transmitting an auto notification to stakeholders associated with the data elements included in the auto notification list. Methods may also include transmitting a non-auto notification to stakeholders associated with data elements included in the non-auto notification list. The stakeholder contact data may be retrieved from metadata associated with the data elements.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus, systems and methods for identifying an impact of a modification made to an API is provided. The system may include and/or be executed by one or more processors.

Systems may include an association rule learning subsystem. The association rule learning subsystem may be executed by the one or more processors. The association rule learning subsystem may identify one or more elements in an API. The association rule learnings subsystem may also identify channels, business functions and data sources, both upstream and downstream, that interact, directly or indirectly, with each of the API elements.

Channels may include a variety of platforms, such as a mobile platform, an online platform, an online banking platform and a call center platform. Business functions, which may be included in a business layer, may include an industry department information source, such as a consumer line of business (LOB) information source, a small business LOB information source, a payment LOB information source, a wire transfer LOB information source and a mortgage LOB information source. Data sources, which may be included in a data layer, may include Oracle™ databases, Hadoop™ database, production logs and any other suitable data sources.

The association rule learning subsystem may receive input from a variety of sources. These sources may include an API. The API may include a plurality of API elements. Such API elements may include one or more fields, one or more schemas, one or more field types, one or more field values any other suitable API elements.

At times, when the API elements have not been previously processed, the plurality of API elements may be received from the API via an element preprocessor. However, when the API has already been processed, the plurality of API elements is received directly from the API.

The API may also include a proposed modification to the API. In some embodiments, the proposed modification may be included as a commented-out portion of the API.

In some embodiments, the API may not include the proposed modification to the API, rather the API may be transmitted separately from the proposed modification. The proposed modification may be included in the variety of sources. The proposed modification may be included as a selection of an API.

In certain embodiments, the proposed modification may not be transmitted to the association rule learning subsystem. As such, the association rule learning subsystem may identify various channels, business functions and data sources associated with each element included in the API.

In certain embodiments, the association rule learning subsystem may only identify various channels, business functions and data sources that are associated with the proposed modification.

A metadata processor may also provide input to the association rule learning subsystem. The metadata processor may retrieve data elements that are associated, directly or indirectly, with at least one API element, included in the plurality of API elements. The data elements may include databases and/or production logs.

The metadata processor may retrieve the data elements from a plurality of channels, such as the platforms described above. The metadata processor may retrieve the data elements from a data layer, which may include one or more databases or data sources. The metadata processor may also retrieve the data elements from a business layer, which may include one or more line of business information sources, such as those described above.

The variety of sources may include a plurality of production logs. In some embodiments, the production logs may be received at the metadata processor from the data layer. In other embodiments, the production logs may be received directly at the association rule learning subsystem.

The association rule learning subsystem may link each API element, included in the plurality of API elements, with every data element retrieved from the metadata processor. The association rule learning subsystem may create a tree showing a plurality of interactions between the API elements and the linked data elements. The association rule learning subsystem may output the tree of API elements and the linked data elements into a tabulated structure.

The system may also include a recommender subsystem. The recommender subsystem may organize the output of the association rule learning subsystem. In order to direct the remediation efforts to the systems which are most likely to be impacted, the recommender subsystem may rate and organize the output of the association rule learning subsystem.

The recommender subsystem may receive the tabulated structure of the API elements associated with the API. The recommender subsystem may also receive the plurality of production logs. The recommender subsystem may also receive a criteria listing. The criteria listing may include an application severity metric for each data element, a frequency usage metric for each data element and a complexity metric for each data element.

The recommender subsystem may prioritize the data elements included in the tabulated structure based firstly on the criteria listing and secondly on the production logs. The recommender subsystem may select a top predetermined number of data elements from the prioritized tabulated structure. The selection may identify data elements that will be affected, over a predetermined threshold of probability, by the proposed modification to the API. The recommender subsystem may notify a stakeholder associated with each of the top predetermined number of data elements.

In some embodiments, the recommender subsystem may feed the top predetermined number of data elements into an executable subsystem. The executable subsystem may modify the data elements in order that the data elements continue to function after the proposed modification is made to the API.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
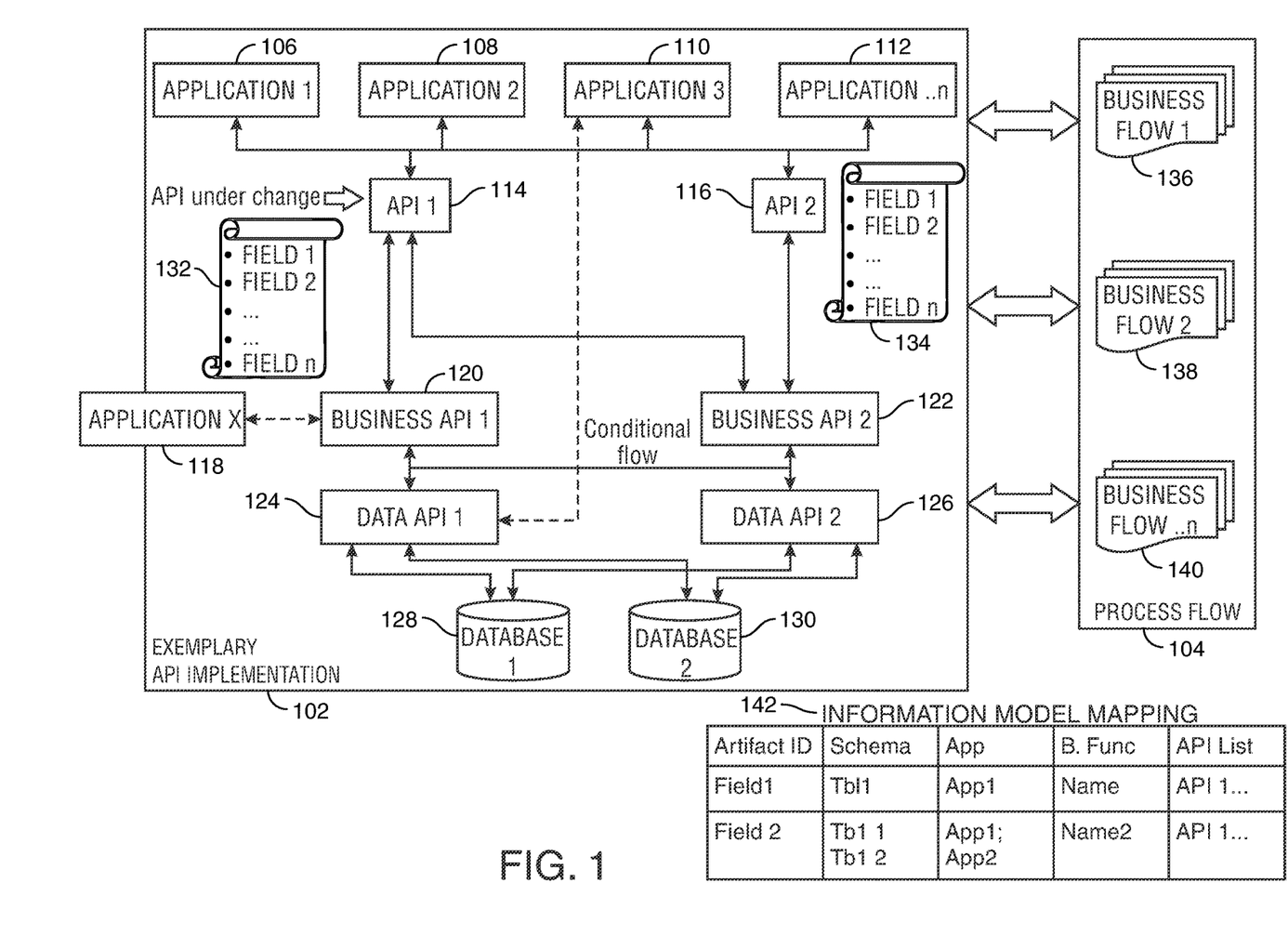
FIG. 1 shows an illustrative diagram in accordance with principles of the disclosure.

FIG. 1 shows an illustrative diagram. The illustrative diagram includes an API that is being modified and the various applications and APIs that may be affected.

One example of an API that is utilized horizontally across multiple channels may involve an account services API. The account services API may be references by various channels, such as a mobile channel, an online channel and an in-person channel.

API 1, shown at 114, may undergo a modification or change. The following description shows the exemplary API implementation 102. The exemplary API implementation 102 includes various applications and APIs that are interconnected with API 1, shown at 114. Application 1, shown at 106, application 2, shown at 108, application 3, shown at 110 and other applications, as indicated by application n, shown at 112, may access API 1, shown at 114 and API 2, shown at 116.

API 1, shown at 114, may include multiple fields, as shown at 132. The modification may include adding one or more fields to API 1. The modification may also include deleting one or more fields from API 1. The modification may include modifying the name of the field, the description of the field and/or the number of characters allotted to the field. The modification may also include changing the field type from a first field type to a second field type. An example of a field type change may include changing a field from an integer type to a string type, or from a string type to an enumerated value type.

API 1, shown at 114, may access business API 1, shown at 120 and business API 2, shown at 122. Business API 1, shown at 120, may also be accessed by application X, shown at 118. Business API 1, shown at 120, may communicate with data API 1, shown at 124, business API 2, shown at 122, data API 1, shown at 124 and data API 2, shown at 126. There may be a conditional flow between business API 1, shown at 120, and business API 2, shown at 122, data API 1, shown at 126 and data API 2, shown at 126.

API 1, shown at 114, may access business API 2, shown at 122. API 2, shown at 116 may access business API 2, shown at 122. Business API 2, shown at 122, may access business API 1, shown at 120, data API 1, shown at 124 and data API 2, shown at 126.

Application 3, shown at 110 may also communicate directly with data API 1.

Data API 1, shown at 124, may transmit data to, and retrieve data from, database 1, shown at 128 and database 2, shown at 130. Data API 2, shown at 126 may also transmit data to, and retrieve data from, database 1, shown at 128 and database 2, shown at 130.

Each of the applications, APIs, and database may interface with one or more process flows, as shown at 104. The process flows may include business flow 1, shown at 136, business flow 2, shown at 138 and business flow n, shown at 140. Business flow n may indicate various other business flows.

Information model mapping, shown at 142, may include a list of artifact identifiers, schemas, applications, functions and API lists. Each line of the information model mapping may show the relationship between an artifact, one or more schemas, one or more applications, one or more functions and one or more API lists.

It should be noted that when an element or a field from business API 1, shown at 120, changes, the directed relationship of API 1, shown at 114, Application X, shown at 118, data API 1, shown at 124 and database 1, shown at 128, may be identified from a meta portal catalogue. However, the indirect relationship between business API 1, shown at 120, and data API 2, shown at 126 and database 2, shows at 130 may be captured only through the association rule learning engine and recommender system, shown in FIG. 2.

Figure 2:
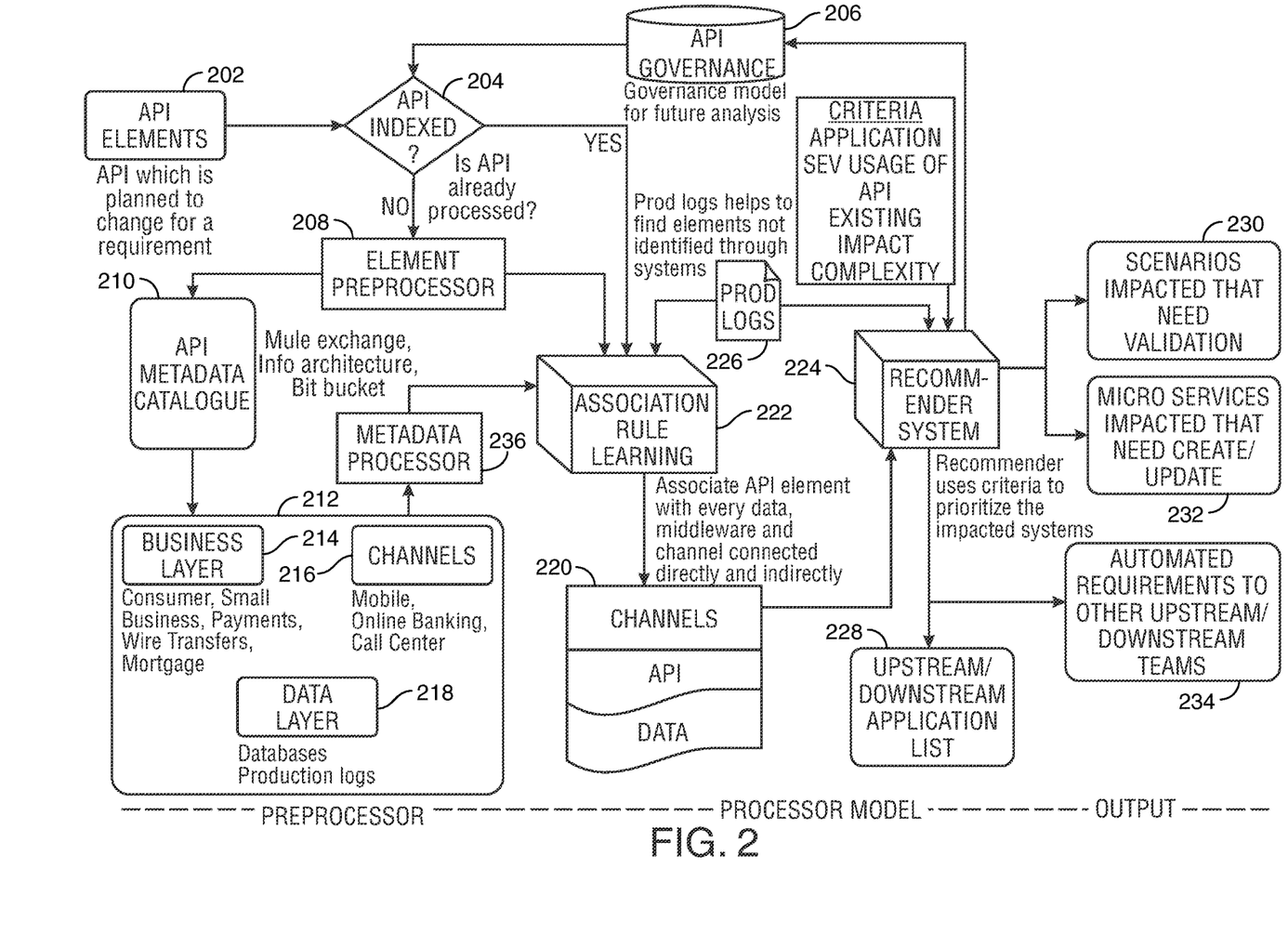
FIG. 2 shows another illustrative diagram in accordance with principles of the disclosure.

FIG. 2 shows an illustrative flow chart. The illustrative flow chart shows a flow for identifying impacts that may occur in various applications and APIs as a result of a change made in an API. It should be appreciated that the flow may be divided into three sections (or more, or less): a preprocessor section, a processor model section and an output section.

The API which is planned to undergo a change may be referred to, in connection with FIG. 2, as a first API. The first API may include a plurality of API elements. API elements may include components of the API, such as API fields, API headers and any other portions of the API. The planned change may involve one of the API elements.

An example of a planned change may involve an API relating to name information. The name information API may include a first name field, a middle name field and a last name field. The planned change may be to remove the middle name field from the API.

API elements 202 may include various API elements relating to the first API. Query 204 may query whether the first API has already been processed. In the event that the first API has already been processed, the flow may proceed to association rule learning engine 222. In the event that the first API has not been processed, the flow may proceed to element preprocessor 208. Element preprocessor 208 may preprocess the first API. The preprocessing of the first API may enable the API to be processed by association rule learning engine 222.

Element preprocessor 208 may invoke API metadata catalogue 210. API metadata catalogue 210 may access hub 212. API metadata catalogue 210 may determine channels, business layers and/or data sources within hub 212 that may be affected by the modification to the API element. Hub 212 may include a business layer 214, a channels layer 216 and a data layer 218. Business layer 214 may include data and/or applications relating to consumer, small business, payments, wire transfers and/or mortgages.

Metadata processor 236 may organize the list of channels, business layers and data sources that may be affected by the modification to the API. The organized list may be fed into association rule learning engine 222.

Production logs 226 may also be fed into the association rule learning engine 222. Production logs 226 may include historical data relating to the overall system. As such, production logs 226 may include data relating to frequency and relationships of API usage.

Association rule learning engine 222 may associate each API element with every data source, middleware and channel connected to the API directly and indirectly.

The output of association rule learning engine 222 may be inputted into recommender system 224. Recommender system may prioritize the output of the association rule learning engine 222. The prioritization may be based on criteria, including application severity, usage frequency of API and existing impact complexity.

The output of recommender system 224 may include a list of upstream/downstream application list 228 and automated requirements to other upstream/downstream teams 234. The output of recommender system 224 may also include scenarios that need validation 230. Such scenarios may include applications and/or APIs that may have a high percentage of probability of being need of repair after the modification made to the API. The output of recommender system 224 may also include micro services that need create/update 232. Such micro services may include services that require creation or updating after the modification mad to the API.

Figure 3:
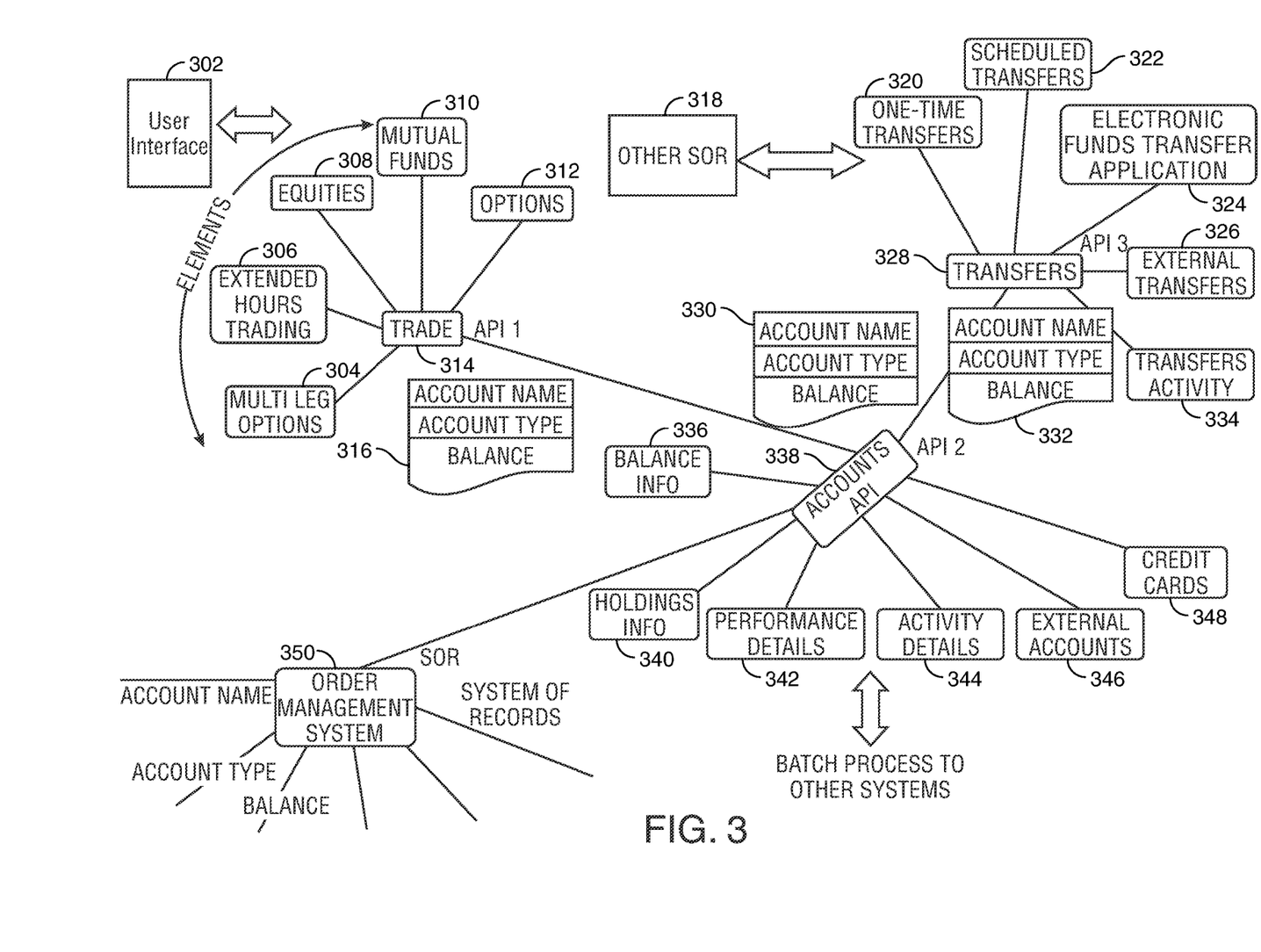
FIG. 3 shows yet another illustrative diagram in accordance with principles of the disclosure.

FIG. 3 shows an illustrative flow diagram. The illustrative flow diagram shows an illustrative output of the association rule learning engine. The association rule learning engine shows the APIs and the associated components. The components may include a user interface 302. API 1 associated with trade 314 may include the following components: multi leg options 304, extended hours trading 306, equities 308, mutual fund 310 and options 312. API 1 may also include elements account name, account type and balance, as shown at 316.

API 2, associated with accounts API 338, may include the following components: balance information 336, holdings info 340, performance details 342, activity details 344, external accounts 346 and credit cards 348. Accounts API 338 may also be associated with order management system 350. API 2 may also include elements: account name, account type and balance, as shown at 330.

API 3, associated with transfers 328, may include the following components one-time transfers 320, other system of record (SOR) 318, scheduled transfers 322, electronic funds transfer application 324, external transfers 326 and transfers activity 334. API 3 may include elements: account name, account type and balance, as shown at 332.

Thus, a model to recommend impacted systems is provided. Persons skilled in the art will appreciate that the present invention can be practiced by other than the described embodiments, which are presented for purposes of illustration rather than of limitation. The present invention is limited only by the claims that follow.

What is claimed is:

1. A system for identifying an impact of a modification made to application programming interface ("API"), the system comprising:
    an association rule learning subsystem configured to:
        receive input from:
            an API, said API including a plurality of API elements and a proposed modification to the API;
            a metadata processor, said metadata processor operable to retrieve data elements, said data elements being associated, directly, or indirectly, with at least one API element included in the plurality of API elements, from:
                a plurality of channels;
                a data layer; and
                a business layer; and
            a plurality of production logs;
        link each API element included in the plurality of API elements with every data element retrieved from the metadata processor, based on data included in the plurality of production logs;
        create a tree showing a plurality of interconnections between the API elements and the linked data elements;
        output the tree of API elements and the linked data elements into a tabulated structure;
    a recommender subsystem, configured to:

receive input:
  from the association rule learning subsystem, said input comprising a tabulated structure of the API elements associated with the API;
  the plurality of production logs;
  a criteria listing, said criteria listing comprising:
    an application severity metric for each data element;
    a frequency usage metric for each data element;
    a complexity metric for each data element; and
  prioritize the data elements included in the tabulated structure based firstly on the criteria listing and secondly on the production logs;
  select a top predetermined number of data elements from the prioritized tabulated structure, said selection identifying data elements that will be affected, over a predetermined threshold of probability, by the proposed modification to the API; and
  notify a stakeholder associated with each of the top predetermined number of data elements.

2. The system of claim 1, wherein the plurality of channels comprises a mobile channel, an online banking channel and a call center channel.

3. The system of claim 1, wherein the data elements comprise databases and production logs.

4. The system of claim 1, wherein the business layer comprises data relating to consumers, small businesses, payments, wire transfers and mortgages.

5. The system of claim 1, wherein, when the API elements have not been previously processed, the plurality of API elements is received from the API via an element preprocessor.

6. The system of claim 1, wherein the plurality of API elements is received directly from the API when the API has already been processed.

7. A method for identifying an impact of a modification made to application programming interface ("API"), the method comprising:
  receiving the API, said API comprising a plurality of API elements, said API being identified for a modification;
  determining whether the API is indexed;
  when the API is indexed, transmitting the API to an association rule learning subsystem;
  when the API is not indexed, transmitted the API to an element preprocessor;
  accessing, by the element preprocessor, an API metadata catalogue;
  accessing, by the API metadata catalogue, a business layer, channel layer and data layer;
  identifying, by a metadata processor, from the business layer, channel layer and data layer, a plurality of APIs, applications and data elements that are interconnected with the API;
  transferring the interconnected API data from the metadata processor to the association rule learning subsystem;
  transferring a plurality of production logs to the association rule learning subsystem, said plurality of production logs comprising historical data relating to the API;
  associating, at the association rule learning subsystem, each API element, included in the API, with each data element, middleware, channel, API and application that is directly and indirectly connected to the API;
  generating, at the association rule learning subsystem, a list of data elements, middleware, channels, APIs and applications that are directly and indirectly connected to the API;
  transferring the list of data elements from the association rule learning subsystem to a recommender subsystem;
  inputting the plurality of production logs to the recommender subsystem;
  inputting a listing of criteria to the recommender subsystem; and
  based on the listing of criteria and the production logs, prioritizing, at the recommender subsystem, the list received from the association rule learning subsystem.

8. The method of claim 7, further comprising dividing the list into two lists: an auto notification list and a non-auto notification list.

9. The method of claim 7, further comprising transmitting an auto notification to stakeholders associated with the data elements included on the auto notification list.

10. The method of claim 7, further comprising transmitting a non-auto notification to stakeholders associated with data elements included on the non-auto notification list.

11. The method of claim 7, wherein the listing of criteria comprises an application severity metric.

12. The method of claim 7, wherein the listing of criteria comprises a usage frequency metric.

13. The method of claim 7, wherein the listing of criteria comprises a complexity metric.

14. The method of claim 7, further comprising identifying the impact of the modification to the API elements, at the association rule learning subsystem, to other APIs and data sources, for every change in element E, identify and associate all the APIs (As), channels (Cs) and database systems (Ds) that are impacted and that need to be changed based on the following weighed links:

$E=\{e_1, e_2, e_3 \ldots e_n\}$ set of n elements in an API
$A=\{a_1, a_2, a_3 \ldots a_n\}$ set of APIs consumed by these APIs
$C=\{c_1, c_2, c_3 \ldots c_n\}$ number of applications (channels) used this element
$D=\{d_1, d_2, d_3 \ldots d_n\}$ number of database systems these element records flow through.

15. The method of claim 7, wherein the recommender subsystem prioritizes based on the listing of criteria and uses the priority of production logs for determination when the listing of criteria is over a threshold of ambiguity.

16. The method of claim 7, wherein the indexing comprises identifying a plurality of APIs and/or applications that are interconnected with the API.

17. A system for identifying an impact of a modification made to application programming interface ("API"), the system comprising: a memory for storing an association rule learning subsystem configured to: receive: an API, said API comprising a plurality of API elements; a proposed modification to the API; a plurality of data elements, from a metadata processor, said data elements being associated, directly, or indirectly, with at least one API element included in the plurality of API elements; and a plurality of production logs; link each API element included in the plurality of API elements with every data element retrieved from the metadata processor; create a tree showing a plurality of interconnections between the API elements and the linked data elements; output the tree of API elements and the linked data elements into a tabulated structure; a memory for storing a recommender subsystem, configured to: receive input: from the association rule learning subsystem, said input comprising a tabulated structure of the API elements associated with the API; the plurality of production logs; a criteria listing, said criteria listing comprising: an application severity metric for each data element; a frequency usage metric for each data element; a complexity metric for each data element; and prioritize the data elements included in the tabulated structure based firstly on the criteria listing and secondly on the production logs; select a top predetermined number of data elements from the prioritized tabulated structure, said selection identifying data elements that will be affected, over a predetermined threshold of probability, by the proposed modification to the API; and notify a stakeholder associated with each of the top predetermined number of data elements.

18. The system of claim 17, wherein, when the API elements have not been previously processed, the plurality of API elements is received from the API via an element preprocessor.

19. The system of claim 17, wherein the plurality of API elements is received directly from the API when the API has already been processed.

20. The system of claim 17, further comprising an executable subsystem operable to:
   receive the top predetermined number of data elements; and
   modify the data elements in order that the data elements continue to function after the proposed modification is made to the API.

\* \* \* \* \*